United States Patent Office 3,347,859
Patented Oct. 17, 1967

3,347,859
2-MERCAPTO-s-TRIAZINES
Hans-Georg Schmelzer, Cologne, Stammheim, and Eberhard Degener, Opladen, Germany, assignors to Farbenfabriken Bayer Aktiengesellschaft, Leverkusen, Germany, a corporation of Germany
No drawing. Filed June 1, 1965, Ser. No. 460,548
Claims priority, application Germany, July 17, 1964,
F 43,475/64
6 Claims. (Cl. 260—248)

The invention relates to substituted 2-mercapto-s-triazines and to a process for the production thereof.

It is known that nitriles can be trimerized to form derivatives of s-triazine. The trimerization of thiocyanates was hitherto only investigated as regards the example of methylthiocyanate (s-Triazines and Derivatives, E. M. Smolin and L. Rapoport, Interscience Publishers, Inc., New York, 1959, page 111). It was then also only successful in an impure methylthiocyanate was used and treated at temperatures of from 180–185° C. to obtain 2,4,6-trimethylthio-s-triazine in a yield of only 50%. At such high temperatures, the thiocyanates have a very strong tendency to isomerize to the corresponding isothiocyanates.

It has now been found that thiocyanates of the general Formula I can be co-trimerized at temperatures between −20 and +100° C. (advantageously between 0 and +50° C.) in the presence of hydrogen chloride or bromide, and optionally Lewis acids, at normal pressure or raised pressure with suitable nitriles of the general Formula II to form good yields of homogeneous substituted 2-mercapto-s-triazines of the general Formula III.

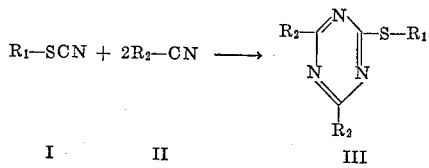

In the above general formulae $R_1$ represents alkyl, cycloalkyl, benzyl, mono-, di- and trichlorobenzyl, phenyl and mono-, di-, tri-, tetra- and pentachlorophenyl radicals.

$R_2$ represents the groupings $R_3$—$CCl_2$— and $R_4$—O—CO, wherein $R_3$ represents hydrogen, chlorine, alkyl and chlorinated alkyl radicals and $R_4$ represents alkyl, phenyl and mono-, di-, tri-, tetra- and pentachlorophenyl radicals. As alkyl radicals $R_1$ are preferred alkyl radicals with 1 to 12 carbon atoms. As alkyl and chlorinated alkyl radicals $R_3$ and alkyl radicals $R_4$ are preferred alkyl radicals with 1 to 6 carbon atoms.

The following are considered as examples of nitriles of the general formula indicated above: trichloroacetonitrile, dichloroacetonitrile, 1,1-dichloropropionitrile, 1,1,2-trichloropropionitrile, pentachloropropionitrile, 1,1-dichlorobutyronitrile, cyanocarbonic acid methyl ester, cyanocarbonic acid ethyl ester, cyanocarbonic phenyl-ester, cyanocarbonic acid-2,4-dichlorophenyl-ester, cyanocarbonic acid-pentachlorophenyl-ester.

Suitable thiocyanates are for example: methylthiocyanate, ethylthiocyanate, benzylthiocyanate, phenylthiocyanate, pentachlorophenylthiocyanate, propylthiocyanate, butylthiocyanate, isoamylthiocyanate, dodecylthiocyanate, cyclohexylthiocyanate, 2-, 3- and 4-chlorobenzylthiocyanate, 2,3-, 2,4-, 2,5-, 2,6-, 3,4- and 3,5-dichlorobenzylthiocyanate, 2,3,5-, 2,3,6-, 2,4,6-, 2,4,5- and 3,4, 5 - trichlorobenzylthiocyanate, trichlorobenzylthiocyanate isomer mixtures, 2-, 3- and 4-chlorophenylthiocyanate, 2,2,4-, 3,4-, 2,5-, 3,5- and 2,6-dichlorophenylthiocyanate, 2,3,5-, 2,3,6-, 2,4,5-, 2,4,6- and 3,4,5 - trichlorophenylthiocyanate and 2,3,5,6-tetrachlorophenylthiocyanate.

The reactions in accordance with the process of the invention are preferably carried out by introducing dry hydrogen chloride or bromide into the mixture of nitrile and thiocyanate, as such or in solution in a suitable solvent, at temperatures between −20 and +100° C., advantageously between 0 and +50° C. The nitrile and thiocyanate can be used in the molar ratio of 2:1, but also one of the two components can be used in excess, the component in excess then representing the solvent. It is surprising that always a homogeneous 2-mercapto-s-triazine of the aforementioned general formula is obtained which is composed of 2 mols of nitrile and 1 mol of thiocyanate when using the process according to the invention.

Many reactions in accordance with the process of the invention proceed exothermally and have to be cooled. In some cases, it is advisable to carry out the reactions in the presence of advantageously 0.01 to 5% of a Lewis acid. It is known that Lewis acids catalyze the isomerization of thiocyanates to the corresponding isothiocyanates. The formation of isothiocyanates was, however, not observed under the gentle temperature conditions of the process according to the invention. In order to produce a higher hydrogen chloride or hydrogen bromide concentration, is is advantageous in many cases to allow the cyclization reactions to take place in an autoclave at hydrogen chloride or bromide pressures of 2 to 50 atm. gauge in the aforementioned temperature range.

Solvents which can optionally be used for the reactions according to the process of the invention are for example 1,2-dichlorethane, chloroform, methylene chloride, carbon tetrachloride, ethyl acetate, diethyl ether and benzene.

Aluminium chloride, zinc chloride, boron trifluoride and aluminium bromide can for example be used as Lewis acids.

The reactions according to the invention usually take place practically quantitatively in a few hours. In some cases, the reaction mixture, after saturation with hydrogen chloride or bromide, can be left to stand for a few days for the complete conversion.

The 2-mercapto-s-triazines often crystallize out on completion of the reaction or they are obtained in crystalline form after concentrating a solvent, which may have been used, by evaporation and can then be purified by recrystallization. Liquid reaction products can be distilled under high vacuum, possibly after removing the solvent and after washing out any Lewis acid which has been used.

The products obtainable according to this process are valuable intermediates, for instance, for the production of dyestuffs. By reacting 2-methylmercapto-4,6-bis-(trichloromethyl)-s-triazine with the sodium salt of the 2-amino-5-hydroxy-6-phenylazo-7,2'-naphthalene - disulphonic acid in dimethyl formamide methylmercaptane is split off and a water soluble orange-brown product is obtained, which is suitable for the so-called reactive dying of cellulose material according to Belgium Patent 612,026. Also the other products obtainable according to this process can be used in the same manner.

*Example 1*

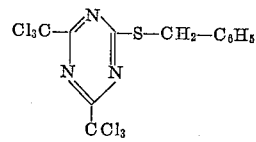

Dry hydrogen chloride is introduced with external cooling at 0–10° C. for 2 hours into the solution of 49.7 parts by weight of benzyl thiocyanate, 96.4 parts by weight of trichloracetonitrile and 5 parts by weight of anhydrous zinc chloride in 125 parts by weight of 1,2-dichlorethane, and the reaction mixture is left to stand for 12 hours. The 1,2-dichlorethane is then distilled off to leave a crystalline crude product which is light brown in color. Colorless crystals with the melting point of 83–84° C. are obtained by re-crystallization from methanol. Yield: 140 parts by weight, 96% of the theoretical.

$C_{12}H_7Cl_6N_3S$ (438):
  Calculated: C, 32.88; H, 1.60; Cl, 48.63; N, 9.59; S, 7.31.
  Found: C, 32.87; H, 1.87; Cl, 48.35; N, 9.51; S, 7.25.

Instead of benzylthiocyanate, in the same manner as described above 2-, 3- and 4-chlorobenzylthiocyanate, 2,3-, 2,4-, 2,5-, 2,6-, 3,4- and 3,5-dichlorobenzylthiocyanate, 2,3,5-, 2,3,6-, 2,4,6-, 2,4,5- and 3,4,5-trichlorobenzylthiocyanate and mixtures of isomeric trichlorobenzylthiocyanates can be used. In the same way the chlorinated 2-benzylmercapto-4,6-bis-(tri - chloromethyl)-s-triazines are obtained.

*Example 2*

The procedure is as in Example 1, but zinc chloride was not added, and there are obtained 142 parts by weight, 97% of the theoretical, of 2-benzylmercapto-4,6-bis-(trichloromethyl)-s-triazine.

*Example 3*

Dry hydrogen chloride is introduced for 2 hours into a mixture of 49.7 parts by weight of benzylthiocyanate and 96.4 parts by weight of trichloracetonitrile, the reddish-brown reaction mixture has completely crystallized through. The yield of pure 2-benzylmercapto-4,6-bis-(trichloromethyl)-s-triazine, after being recrystallized from methanol, is somewhat lower than in Examples 1 and 2.

*Example 4*

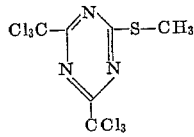

Dry hydrogen chloride is introduced into the solution of 50 parts by weight of methyl thiocyanate, 198 parts by weight of trichloracetonitrile and 5 parts by weight of anhydrous zinc chloride in 125 parts by weight of 1,2-dichlorethane, this taking place with external cooling for half an hour at 0 to 10° C. The cooling means are then removed and hydrogen chloride is introduced for another 3 hours, the reaction temperature rising to 35° C. Thereafter, the reaction mixture is once again saturated at 0 to 10° C. with hydrogen chloride and is left to stand overnight. Some of the reaction product already crystallizes from the solvent which is present. The 1,2-dichlorethane is removed in vacuo, the residue is re-crystallized from n-butanol and there are obtained 201 parts by weight, 81% of theoretical, of 2-methylmercapto-4,6-bis-(trichloromethyl)-s-triazine as colorless crystals with the melting point of 63° C.

$C_6H_3Cl_6N_3S$ (363):
  Calculated: C, 19.90; H, 0.83; Cl, 58.84; N, 11.60; S, 8.84.
  Found: C, 20.32; H, 0.84; Cl, 58.85; N, 11.68; S, 9.05.

In analogous manner 2-methylmercapto-4,6-bis(dichloromethyl)-s-triazine is obtained when using dichloroacetonitrile instead of trichloroacetonitrile.

*Example 5*

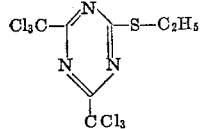

Dry hydrogen chloride is introduced into the solution of 50 parts by weight of ethyl thiocyanate, 166 parts by weight of trichloracetonitrile and 5 parts by weight of anhydrous zinc chloride in 125 parts by weight of 1,2-dichlorethane, this initially taking place for 3 hours at 20° C. without external cooling. The temperature of the reaction mixture rises to 28° C. Thereafter, hydrogen chloride is introduced for another half an hour at 0 to 10° C. and the mixture left to stand overnight. The solvent is distilled off in a water jet vacuum and the oily residue is fractionated under high vacuum. At 154–157° C./0.4 mm. Hg, 163 parts by weight, i.e. 75% of the theoretical of 2-ethylmercapto-4,6-bis-(trichlormethyl)-s-triazine distil over as a colorless oil.

$C_7H_5Cl_6N_3S$ (376):
  Calculated: C, 22.34; H, 1.33; Cl, 56.65; N, 11.17; S, 8.51. Found: C, 22.54; H, 1.54; Cl, 57.30; N, 11.22; S, 8.85.

In analogy to Example 5 the 2-propylmercapto-, 2-butylmercapto-, 2-dodecylmercapto- and 2-cyclohexylmercapto-4,6-bis-(trichloromethyl)-s - triazines are obtained, using equimolecular amounts of propyl-, butyl-, dodecyl- and cyclohexyl-thiocyanate instead of ethyl-thiocyanate

*Example 6*

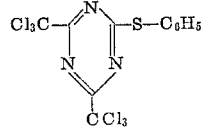

Dry hydrogen chloride is introduced for 2 hours into the solution of 45 parts by weight of phenyl thiocyanate and 96.4 parts by weight of trichloracetonitrile in 125 parts by weight of 1,2-dichlorethane at 0–5° C. The solution is left to stand overnight, the solvent is distilled off in vacuo, the residue is re-crystallized from methanol and a practically quantitative yield of 2-phenylmercapto-4,6-bis-(trichloromethyl)-s-triazine is obtained as colorless crystals having the melting point 68–70° C.

$C_{11}H_5Cl_6N_3S$ (424):
  Calculated: C, 31.13; H, 1.18; Cl, 50.24; N, 9.91; S, 7.55. Found: C, 31.51; H, 1.53; Cl, 50.05; N, 9.89; S, 7.30.

The corresponding 2-monochlorophenyl-, 2-dichlorophenyl-, 2-trichlorophenyl-, 2-tetrachlorophenyl- and 2-pentachlorophenyl-4,6-bis-(trichlormethyl)-s-triazines are obtained when according to the process described above instead of phenylthiocyanate, 2-, 3- and 4-chloro-, 2,4-, 3,4-, 2,5-, 3,5- and 2,6-dichloro-, 2,3,5-, 2,3,6-, 2,4,5-, 2,4,6- and 3,4,5-trichloro-, 2,3,5,6-tetrachloro- and pentachlorophenylthiocyanates are used in equimolecular amounts.

*Example 7*

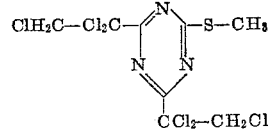

Dry hydrogen chloride is introduced into a mixture of 36.5 parts by weight of methyl thiocyanate, 158.5 parts by weight of trichloropropionitrile and 2 parts by weight of anhydrous aluminium chloride, the introduction being initially for half an hour at 0–5° C., thereafter for 2 hours at 40–50° C. and finally for 8 hours at 0–10° C. Small quantities of unreacted starting material are distilled off in a water jet vacuum, the oily residue is taken up in methylene chloride, the methylene chloride solution is washed twice with water, dried over calcium chloride and the methylene chloride is distilled off. The oily residue which now remains is fractionated in vacuo. At 200–210° C./1 mm. Hg, the 2-methylmercapto-4,6-bis-(1',1',2'-trichlorethyl)-s-triazine distils over as a yellow oil.

$C_8H_7Cl_6N_3S$ (390):

Calculated: C, 24.62; H, 1.79; Cl, 54.62; N, 10.77; S, 8.21. Found: C, 24.64; H, 1.87; Cl, 55.15; N, 10.80; S, 8.00.

*Example 8*

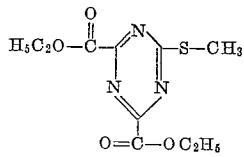

Dry hydrogen chloride is introduced for 2 hours into a mixture of 33 parts by weight of the ethyl ester of cyanocarbonic acid and 12.1 parts by weight of methyl thiocyanate. The temperature of the reaction mixture thereby rises to 41° C. The reaction mixture crystallizes on cooling. After recrystallization from methanol, there is obtained a practically quantitative yield of 2-methylmercapto-4,6-dicarbethoxy-s-triazine as colorless crystals having a melting point of 70–72° C.

$C_{10}H_{13}N_3O_4S$ (271):

Calculated: C, 44.18; H, 4.80; N, 15.50; S, 11.81. Found: C, 43.99; H, 5.01; N, 15.24; S, 11.40.

When using an equimolecular amount of cyanocarbonic acid-2,4-dichlorophenyl ester instead of cyancarbonic acid ethyl ester there is obtained 2-methylmercapto-4,6-bis-(carbo-2',4'-dichlorophenoxy)-s-triazine.

What we claim is:

1. A compound of the formula

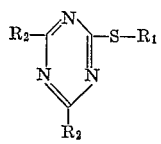

in this formula $R_1$ being a member selected from the group consisting of alkyl radicals with 1 to 12 carbon atoms, cyclohexyl, benzyl, mono-, di- and trichlorobenzyl, phenyl and mono-, di-, tri-, tetra- and pentachlorophenyl radicals and $R_2$ being a member selected from the group consisting of the groupings $R_3$—$CCL_2$— and $R_4$—O—CO—, wherein $R_3$ represents a member selected from the group consisting of hydrogen, chlorine, alkyl radicals with 1 to 6 carbon atoms and chlorinated alkyl radicals with 1 to 6 carbon atoms and $R_4$ represents a member selected from the group consisting of alkyl radicals with 1 to 6 carbon atoms, phenyl and mono-, di-, tri-, tetra- and pentachlorophenyl radicals.

2.

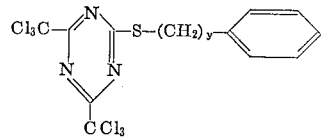

wherein $y$ is 0 to 1.

3.

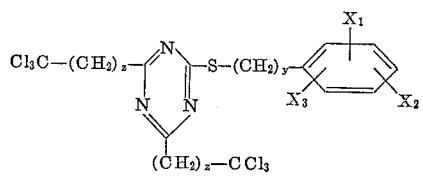

wherein $y$ is zero to 1 and $X_1$ is selected from the group consisting of 2,3 and 4-chloro; and $X_2$ and $X_3$ are selected from the group consisting of 2,3,4,5, and 6-chloro and hydrogen; $z$ is zero to 1 and wherein no carbon atom in said benzyl group has more than one chloro substituent.

4.

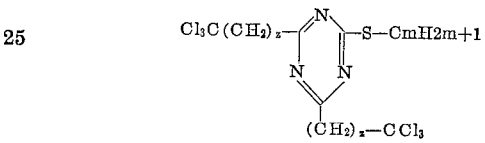

wherein $m$ is 1 to 2, and $z$ is 0 to 1.

5.

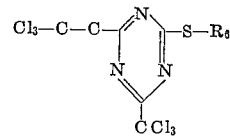

wherein $R_6$ is cyclohexyl.

6.

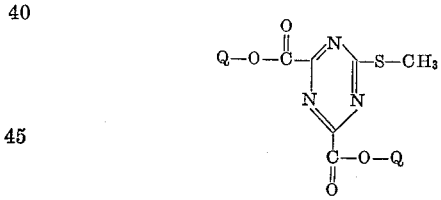

wherein Q is selected from the group consisting of ethyl and chloro-phenyl.

References Cited

UNITED STATES PATENTS

| | | | |
|---|---|---|---|
| 2,525,714 | 10/1950 | Norton | 260—248 |
| 2,858,310 | 10/1958 | Grundmann et al. | 260—248 X |
| 3,071,586 | 1/1963 | Sander et al. | 260—248 |
| 3,095,414 | 6/1963 | Spainhour | 260—248 |

OTHER REFERENCES

Smolin et al., "s-Triazines and Derivatives," Interscience Pub., New York (1959) pp. 111-2.

WALTER A. MODANCE, *Primary Examiner.*

J. FORD, *Assistant Examiner.*